US012671548B2

(12) United States Patent
Liu

(10) Patent No.: US 12,671,548 B2
(45) Date of Patent: Jun. 30, 2026

(54) METHOD FOR INFORMATION TRANSMISSION AND METHOD FOR PARAMETER DETERMINATION, COMMUNICATION DEVICE, AND NON-TRANSITORY COMPUTER-READABLE STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 304 days.

(21) Appl. No.: 18/280,204

(22) PCT Filed: Mar. 4, 2021

(86) PCT No.: PCT/CN2021/079169
§ 371 (c)(1),
(2) Date: Sep. 1, 2023

(87) PCT Pub. No.: WO2022/183456
PCT Pub. Date: Sep. 9, 2022

(65) Prior Publication Data
US 2024/0007248 A1 Jan. 4, 2024

(51) Int. Cl.
*H04L 5/00* (2006.01)
(52) U.S. Cl.
CPC .......... *H04L 5/0051* (2013.01); *H04L 5/0091* (2013.01)

(58) Field of Classification Search
None
See application file for complete search history.

(56) References Cited

U.S. PATENT DOCUMENTS

| | | | | |
|---|---|---|---|---|
| 9,247,555 | B2 * | 1/2016 | Song | H04W 72/21 |
| 9,942,785 | B2 | 4/2018 | Gao | |
| 10,659,981 | B2 | 5/2020 | Gao | |
| 11,284,346 | B2 * | 3/2022 | Xu | H04W 52/0229 |
| 2015/0289155 | A1 | 10/2015 | Gao | |
| 2017/0195031 | A1 | 7/2017 | Onggosanusi et al. | |
| 2018/0176809 | A1 | 6/2018 | Gao | |

(Continued)

FOREIGN PATENT DOCUMENTS

| | | |
|---|---|---|
| CN | 103840907 A | 6/2014 |
| CN | 108111272 A | 6/2018 |

(Continued)

OTHER PUBLICATIONS

International Search Report issued in Application No. PCT/CN2021/079169, dated Nov. 24, 2021 with English translation, (5p).

(Continued)

*Primary Examiner* — Phirin Sam

(74) *Attorney, Agent, or Firm* — Arch & Lake LLP

(57) ABSTRACT
A method for information transmission, performed by a base station, and including: sending physical layer parameter information of a tracking reference signal (TRS) and/or a channel state information reference signal (CSI-RS), wherein the physical layer parameter information is used for indicating a first physical layer parameter used by a user equipment (UE) in a non-connected state when receiving the TRS and/or the CSI-RS.

20 Claims, 4 Drawing Sheets

| UE | | Base station |
|---|---|---|

Wireless comunication

201: sending physical layer parameter information of a TRS and/or a CSI-RS, where the physical layer parameter information is used for indicating a first physical layer parameter used by a UE in a non-connected state when receiving the TRS and/or the CSI-RS

(56)                    References Cited

U.S. PATENT DOCUMENTS

| | | | |
|---|---|---|---|
| 2019/0379431 A1 | 12/2019 | Park et al. | |
| 2020/0177416 A1 | 6/2020 | Jiang et al. | |
| 2020/0396633 A1* | 12/2020 | Tseng | H04W 24/10 |
| 2021/0045076 A1* | 2/2021 | Tomeba | H04W 56/001 |
| 2021/0083794 A1* | 3/2021 | Agarwal | H04L 5/0048 |
| 2021/0091827 A1* | 3/2021 | Namba | H04B 17/309 |
| 2021/0135821 A1* | 5/2021 | Guan | H04L 5/0048 |
| 2021/0282111 A1* | 9/2021 | Yamada | H04L 5/0051 |
| 2021/0320685 A1* | 10/2021 | Venugopal | H04B 1/62 |
| 2021/0352580 A1* | 11/2021 | Zhou | H04W 52/0209 |
| 2021/0360580 A1* | 11/2021 | Nam | H04L 5/0082 |
| 2023/0247715 A1* | 8/2023 | Kim | H04W 76/30 |
| | | | 370/329 |
| 2025/0151027 A1* | 5/2025 | Nam | H04W 72/0446 |

FOREIGN PATENT DOCUMENTS

| | | | |
|---|---|---|---|
| CN | 110072285 A | 7/2019 | |
| CN | 110690947 A | 1/2020 | |
| CN | 111835482 A | 10/2020 | |
| WO | 2019200546 A1 | 10/2019 | |

OTHER PUBLICATIONS

First Office Action of Chinese Application No. 202180000704.7 dated Jun. 16, 2022, (7p).

Notice of Allowance issued to Chinese Application No. 202180000704.7 dated Feb. 17, 2023, (3p).

Qualcomm Incorporated, "TRS/CSI-RS for idle/inactive UE power saving", 3GPP TSG-RAN WG1 #104-e, e-Meeting, Jan. 25, 2021, (6p).

* cited by examiner

| UE | | Base station |
|---|---|---|

Wireless comunication

201:  sending physical layer parameter information of
a TRS and/or a CSI-RS, where the physical layer
parameter information is used for indicating a first
physical layer parameter used by a UE in a non-
connected state when receiving the TRS and/or the
CSI-RS

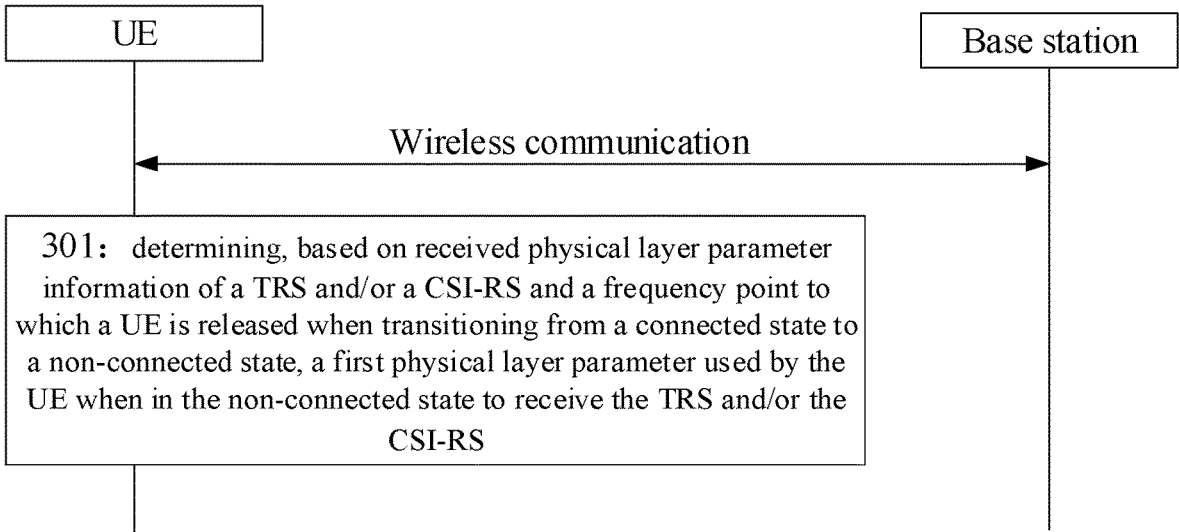

| UE | | Base station |

Wireless communication

301: determining, based on received physical layer parameter information of a TRS and/or a CSI-RS and a frequency point to which a UE is released when transitioning from a connected state to a non-connected state, a first physical layer parameter used by the UE when in the non-connected state to receive the TRS and/or the CSI-RS

FIG. 3

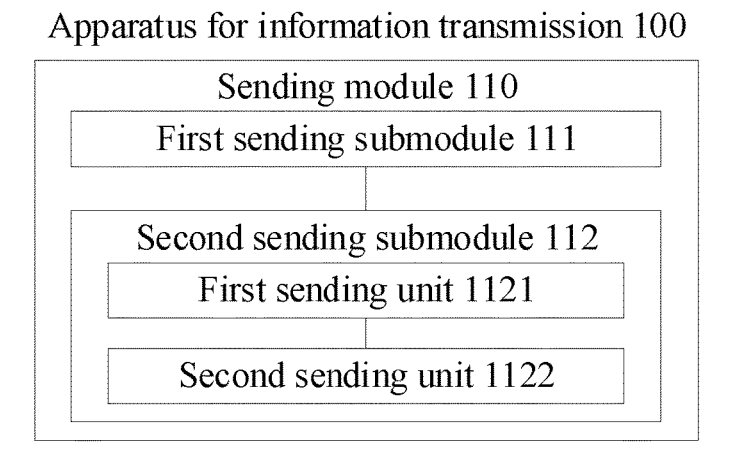

Apparatus for information transmission 100

Sending module 110

First sending submodule 111

Second sending submodule 112

First sending unit 1121

Second sending unit 1122

FIG. 4

METHOD FOR INFORMATION TRANSMISSION AND METHOD FOR PARAMETER DETERMINATION, COMMUNICATION DEVICE, AND NON-TRANSITORY COMPUTER-READABLE STORAGE MEDIUM

CROSS REFERENCE

The present application is National Stage of International Application No. PCT/CN2021/079169, filed on Mar. 4, 2021, the entire contents of which are incorporated herein by reference in their entireties for all purposes.

TECHNICAL FIELD

The present application relates to, but is not limited to, the technical field of wireless communications, and in particular, to a method for information transmission, a method for parameter determination, an apparatus, a communication device, and a storage medium.

BACKGROUND

In the 3rd generation partnership project (3GPP) standardization of the power saving project of the Release 17 (R17), it is proposed that a user equipment (UE) performs downlink synchronization in an idle state or an inactive state through a tracking reference signal (TRS)/a channel state indication reference signal (CSI-RS).

SUMMARY

According to a first aspect of the embodiments of the present disclosure, there is provided a method for information transmission, where the method is performed by a base station, and includes:

sending physical layer parameter information of a TRS and/or a CSI-RS, where the physical layer parameter information is used for indicating a first physical layer parameter used by a user equipment (UE) in a non-connected state when receiving the TRS and/or the CSI-RS.

According to a second aspect of the embodiments of the present disclosure, there is provided a method for parameter determination, where the method is performed by a user equipment (UE), and includes:

determining, based on received physical layer parameter information of a TRS and/or a CSI-RS and a frequency point to which the UE is released when transitioning from a connected state to a non-connected state, a first physical layer parameter used by the UE when in the non-connected state to receive the TRS and/or the CSI-RS.

According to a third aspect of the embodiments of the present disclosure, there is provided a communication device, including a processor, a memory, and an executable program stored on the memory and capable of being run by the processor, where, when the processor runs the executable program, steps of the method for information transmission in the first aspect or the method for parameter determination in the second aspect are performed.

According to a fourth aspect of the embodiments of the present disclosure, there is provided a non-transitory computer-readable storage medium with an executable program stored thereon, where, when the executable program is executed by a processor, steps of the method for information transmission in the first aspect or the method for parameter determination in the second aspect are implemented.

It should be understood that the above general description and the following detailed description are exemplary and explanatory, and cannot limit the embodiments of the present disclosure.

BRIEF DESCRIPTION OF THE DRAWINGS

The accompanying drawings, which are incorporated in and constitute a part of the present description, illustrate embodiments consistent with the present disclosure and, together with the description, serve to explain the principles of the embodiments of the present disclosure.

FIG. 3 is a schematic flowchart of a method for parameter determination according to some embodiments of the present disclosure;

FIG. 4 is a block diagram of an apparatus for information transmission according to some embodiments of the present disclosure;

DETAILED DESCRIPTION

Exemplary embodiments will be described in detail here, examples of which are illustrated in the accompanying drawings. The following description refers to the accompanying drawings in which the same numbers in different drawings represent the same or similar elements unless otherwise represented. The implementations described in the following exemplary embodiments do not represent all implementations consistent with the embodiments of the present disclosure. By contrast, they are examples of apparatuses and methods consistent with some aspects of the embodiments of the present disclosure.

The term used in the embodiments of the present disclosure is for the purpose of describing particular embodiments and is not intended to limit the embodiments of the present disclosure. As used in the embodiments of the present disclosure and the appended claims, the singular forms "a", "the" and "said" are also intended to include plural forms unless the context clearly indicates other meanings. It should also be understood that the term "and/or" as used here refers to and includes any or all possible combinations of one or more associated listed items.

It should be understood that although the terms first, second, third, etc., may be used in the embodiments of the present disclosure to describe various information, these information should not be limited to these terms. These terms are used to distinguish information of the same type from each other. For example, without departing from the scope of the embodiments of the present disclosure, the first information may also be referred to as second information, and similarly, the second information may also be referred to as first information. Depending on the context, the word "if" as used here may be interpreted as "on the time" or "when" or "in response to determining".

Figures 1, 2:
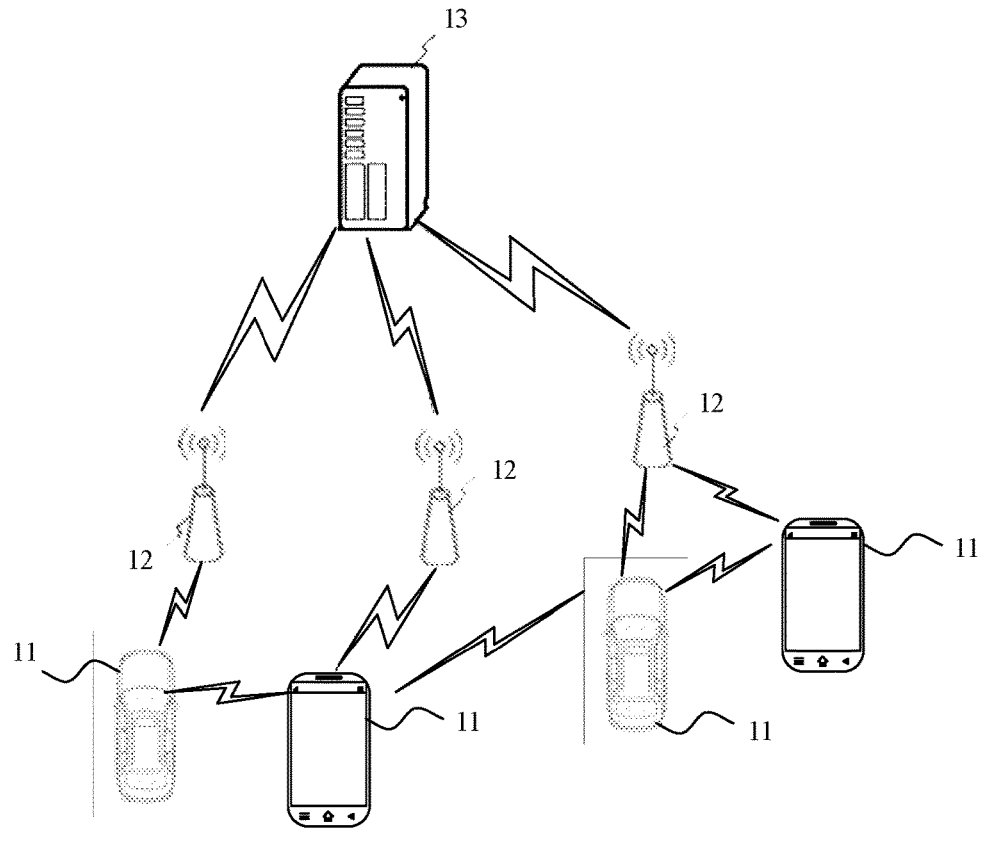
FIG. 1 is a schematic structural diagram of a wireless communication system according to some embodiments of the present disclosure.
FIG. 2 is a schematic flowchart of a method for information transmission according to some embodiments of the present disclosure.

FIG. 1 is a schematic structural diagram of a wireless communication system according to some embodiments of the present disclosure. As shown in FIG. 1, the wireless communication system is a communication system based on a cellular mobile communication technology, and the wireless communication system may include several terminals 11 and several base stations 12.

Among them, the terminal 11 may refer to a device that provides voice and/or data connectivity to a user. The terminal 11 may communicate with one or more core networks via a radio access network (RAN). The terminal 11 may be an Internet of Things terminal, such as a sensor device, a mobile phone (or referred to as a "cellular" phone) and a computer having an Internet of Things terminal. For example, it may be a fixed, portable, pocket, handheld, computer built-in or vehicle-mounted apparatus, such as a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may also be a device of an unmanned aerial vehicle. Alternatively, the terminal 11 may also be a vehicle-mounted device, for example, may be a trip computer having a wireless communication function, or a wireless communication device externally connected to a trip computer. Alternatively, the terminal 11 may also be an infrastructure, for example, may be a street lamp, a signal light or another roadside device having a wireless communication function.

The base station 12 may be a network-side device in a wireless communication system. Among them, the wireless communication system may be the 4th generation mobile communication (4G) system, also referred to as a long term evolution (LTE) system. Alternatively, the wireless communication system may be a 5G system, or also referred to as a new radio (NR) system or a 5G NR system. Alternatively, the wireless communication system may be a next generation system of the 5G system. Among them, the access network in the 5G system may be referred to as an NG-RAN (New Generation-Radio Access Network). Alternatively, the wireless communication system may be an MTC system.

Among them, the base station 12 may be an evolved base station (eNB) used in the 4G system. Alternatively, the base station 12 may also be a base station (gNB) using a centralized distributed architecture in the 5G system. When the base station 12 uses a centralized distributed architecture, the base station 12 generally includes a central unit (CU) and at least two distributed units (DU). The centralized unit is provided with a protocol stack for a packet data convergence protocol (PDCP) layer, a radio link layer control protocol (RLC) layer, and a media access control (MAC) layer; the distribution unit is provided with a Physical (PHY) layer protocol stack, and the specific implementation manner of the base station 12 is not limited in the embodiments of the present disclosure.

A wireless connection may be established between the base station 12 and the terminal 11 through the wireless air interface. In different embodiments, the wireless air interface is a wireless air interface based on the 4th generation mobile communication network technology (4G) standard. Alternatively, the wireless air interface is a wireless air interface based on the 5th generation mobile communication network technology (5G) standard, for example, the wireless air interface is a new radio. Alternatively, the wireless air interface may also be a wireless air interface based on a next generation mobile communication network technology standard of 5G.

In some embodiments, an E2E (End to End) connection may also be established between the terminals 11, such as scenes of V2V (Vehicle to Vehicle) communication, V2I (Vehicle to Infrastructure) communication and V2P (Vehicle to Pedestrian) communication in vehicle to everything communication (V2X).

In some embodiments, the wireless communication system may further include a network management device 13.

Several base stations 12 are respectively connected to the network management device 13. Among them, the network management device 13 may be a core network device in the wireless communication system. For example, the network management device 13 may be a mobility management entity (MME) in an evolved packet core (EPC). Alternatively, the network management device may also be another core network device, such as a serving gateway (SGW), a public data network gateway (PGW), a policy and charging rules function (PCRF), or a home subscriber server (HSS), etc. For the implementation form of the network management device 13, the embodiments of the present disclosure do not limit.

The execution entity involved in the embodiments of the present disclosure includes, but is not limited to, a UE such as a mobile phone terminal supporting cellular mobile communication, and a base station, etc.

One application scene of the embodiments of the present disclosure is that a UE in a connected state, a UE in an idle state, and a UE in an inactive state may share a TRS and/or a CSI-RS. In the related art, the base station configures the TRS and/or CSI-RS physical layer parameter such as a QCL parameter and/or an SCS parameter for the UE in a connected state, which is used for the UE in a connected state to receive the TRS and/or the CSI-RS. Currently, there is no specific provisions for configuration manners and specific configuration content of the TRS and/or CSI-RS physical layer parameter for the UE in the idle state and/or the UE in the inactive state. How to configure the physical layer parameter of the TRS and/or the CSI-RS for the UE in the idle state and/or the UE in the inactive state, and which contents are specifically configured for the physical layer parameter are urgent problems to be solved.

As shown in FIG. 2, the present exemplary embodiment provides a method for information transmission, which may be performed by a base station or the like of a cellular mobile communication system and includes the following.

In step 201, physical layer parameter information of a TRS and/or a CSI-RS is sent, where the physical layer parameter information is used for indicating a first physical layer parameter used by a user equipment (UE) in a non-connected state when receiving the TRS and/or the CSI-RS.

Here, the UE may be a mobile phone terminal that performs wireless communication using a cellular mobile communication technology, etc. The base station may be a communication device that provides an access network interface to a UE in a cellular mobile communication system. The UE may be a UE in an idle state or an inactive state.

Here, the UE in a non-connected state includes a UE in an RRC connection idle state and/or a UE in an inactive state. The TRS and/or the CSI-RS may be shared by a UE in a non-connected state and/or a UE in a connected state. The UE in an idle state and/or the UE in an inactive state may monitor the TRS and/or the CSI-RS at a TRS and/or CSI-RS occasion with the UE in a connected state.

For example, the UE in an idle state and/or the UE in an inactive state may perform downlink synchronization based on the monitored TRS and/or CSI-RS.

The base station may carry the physical layer parameter information in existing signaling and send it to the UE. The base station may also carry the physical layer parameter information in dedicated information and send it to the UE.

The first physical layer parameter may be a channel physical feature of a wireless channel for carrying a TRS and/or a CSI-RS between a base station and a UE in a non-connected state, such as a channel bandwidth, etc. The UE in a non-connected state may determine a channel physical feature for transmitting the TRS and/or the CSI-RS based on the first physical layer parameter, and receive the TRS and/or the CSI-RS based on the channel physical feature.

The first physical layer parameter may be consistent with a TRS and/or CSI-RS physical layer parameter configured by the base station for the UE in a connected state, or may not be consistent.

In some embodiments, the first physical layer parameter includes:

a QCL parameter, where the QCL parameter is used for indicating an SSB having a QCL relationship with the TRS and/or the CSI-RS, and/or a QCL type; and/or, an SCS parameter indicating an SCS.

The QCL parameter may indicate an SSB having a QCL relationship with the TRS and/or the CSI-RS.

Signals sent from two different antenna ports may encounter wireless channels with common characteristics, in which case the antenna port is referred to as being QCL. The signals sent from these two different antenna ports may be referred to as having a QCL relationship. If the two antenna ports are QCL, the channel feature of the signal transmitted on one antenna port may be inferred from the channel feature of the signal transmitted on the other antenna port. If the TRS and/or the CSI-RS have a QCL relationship with the SSB, that is, the antenna port that sends the TRS and/or the CSI-RS and the antenna port that sends the SSB are QCL, then the channel feature of the TRS and/or the CSI-RS may be inferred according to the channel feature of the SSB.

The QCL parameter may also indicate a QCL type of the QCL relationship, such as QCL-TypeA, QCL-TypeB, QCL-TypeC, and QCL-TypeD. Different QCL types indicate channel features corresponding to different QCL relationships. For example, QCL-TypeA indicates that there is a QCL relationship on the characteristics of Doppler frequency shift, Doppler propagation, average delay, and delay extension.

For example, the UE may determine an SSB having a QCL relationship with the TRS and/or the CSI-RS according to the QCL parameter, and determine a specific channel feature having a QCL relationship with the SSB based on the QCL type. In this way, the channel feature of the TRS and/or the CSI-RS may be determined. And then, the TRS and/or the CSI-RS is received based on the determined channel feature.

In some embodiments, the QCL type may also be specified by a communication protocol or the like to use a fixed type. In this way, the UE may need to know the SSB having the QCL relationship, and may determine the channel physical feature of the TRS and/or the CSI-RS based on the specified QCL type. The QCL parameter may not include the QCL type.

The SCS parameter may indicate a specific SCS of a TRS and/or a CSI-RS. For example, the SCS parameter may indicate that the SCS is 15 kHz. The UE may directly determine the SCS according to the SCS parameter.

The SCS parameters may also indicate that the UE determines the SCS of the TRS and/or the CSI-RS based on other association information. For example, the SCS parameter may indicate the SCS of the SSB. The UE may determine the SCS of the TRS and/or the CSI-RS based on the SCS of the SSB.

The UE in a non-connected state may receive the TRS and/or the CSI-RS based on the first physical layer parameter, and perform downlink synchronization based on the TRS and/or the CSI-RS. Compared with performing synchronization through a plurality of SSBs, the synchronization duration can be reduced, thus saving the power.

In this way, the UE may determine, based on the received physical layer parameter information, a first physical layer parameter for receiving the TRS and/or the CSI-RS in a non-connected state, realizing that the TRS and/or the CSI-RS are received in the non-connected state. On one hand, the base station may respectively configure the TRS and/or CSI-RS physical layer parameters for the UE in the connected state and the UE in the non-connected state, improving the configuration flexibility of base station. On the other hand, the TRS and/or the CSI-RS are received based on the first physical layer parameter, improving the receiving success rate, and improving the receiving efficiency for the TRS and/or the CSI-RS.

When the UE is released from a connected state to a non-connected state, the base station may release the UE to a serving cell or a neighboring cell according to the signal coverage condition of the UE. Here, the frequency points of the serving cell or the neighboring cell may be different.

The physical layer parameter indicated by the physical layer parameter information sent by the base station may correspond to a serving cell, or may also correspond to a neighboring cell. The UE may determine, based on the released frequency point, whether to use the physical layer parameter indicated by the physical layer parameter information. When the base station does not send the physical layer parameter information, the UE may also determine the physical layer parameter based on the regulations of the communication protocol or the like, and then receive the TRS and/or the CSI-RS.

In this way, the UE may determine, based on the received physical layer parameter information and the frequency point that the UE is released, the first physical layer parameter for receiving the TRS and/or the CSI-RS in the non-connected state, realizing that the TRS and/or the CSI-RS are received in a non-connected state.

In some embodiments, sending the physical layer parameter information of the TRS and/or the CSI-RS includes at least one of the following:

sending a system message, where the system message carries the physical layer parameter information;

sending an RRC connection release message, where the RRC connection release message carries the physical layer parameter information.

The UE may receive a system message when in a connected state or a non-connected state, and obtain the physical layer parameter information from the system message.

For example, if the UE leaving the connected state is released to the current serving cell, the system information of the serving cell may carry the physical layer parameter information at least for the UE in an idle state and/or the UE in an inactive state, such as the physical layer parameter information indicating the QCL parameter. The physical layer parameter information may be used for indicating a QCL relationship configuration table of the TRS/CSI-RS and the SSB of the serving cell, and the QCL relationship of the SSB indicated by the QCL parameter is a reference. Here, the QCL relationship of the SSB indicated by the QCL parameter may also be used for the UE in a connected state. In this way, the UE in a non-connected state may use the QCL relationship of the SSB of the UE in a connected state as a reference.

The UE may receive the RRC connection release message when transitioning from a connected state to a non-connected state, and obtain the physical layer parameter information from the RRC connection release message.

For example, when the RRC connection release message sent by the base station to the UE carries the physical layer parameter information indicating the SCS parameter of the SSB, for example, the SCS parameter may use a field of ssbSubcarrierSspacing, and then, the UE released into an idle state may determine the SCS used by the UE in an idle state based on the SCS parameter. The SCS indicated by the SCS parameter may be the same as the SCS of the SSB configured in the connected state, or may be different.

In some embodiments, sending an RRC connection release message includes: sending the RRC connection release message carrying the QCL parameter in response to the UE being released to a serving cell, where the QCL parameter is at least used for indicating an SSB of the serving cell having a QCL relationship with the TRS and/or the CSI-RS.

For example, if the UE leaving the connected state is released to the current serving cell, the RRC connection release message may be used to carry the physical layer parameter information for the UE in an idle state and/or the UE in an inactive state, such as the physical layer parameter information indicating the QCL parameter. The QCL parameter may be used for indicating a QCL relationship configuration table of the TRS/CSI-RS and the SSB of the serving cell, and the UE may determine the SSB having a QCL relationship with the TRS/CSI-RS with reference to the QCL relationship indicated by the QCL parameter carried in the RRC connection release message.

In some embodiments, the UE may select one of the physical layer parameter information carried in the system message and the physical layer parameter information carried in the RRC connection release message based on the priority of the physical layer parameter information carried in the system message and the priority of the physical layer parameter information carried in the RRC connection release message, and determine the QCL parameter.

The physical layer parameter information carried in the system message and the physical layer parameter information carried in the RRC connection release message may be the same or different.

The physical layer parameter information carried in the system message may indicate a QCL parameter corresponding to the UE in a connected state and/or the UE in a non-connected state. The QCL parameter corresponding to the UE in a connected state and the QCL parameter corresponding to the UE in a non-connected state may be the same or different.

The physical layer parameter information carried in the RRC connection release message may be used for the QCL parameter corresponding to the UE in a non-connected state.

The priority of the physical layer parameter information carried in the system message and the priority of the physical layer parameter information carried in the RRC connection release message may be specified through the communication protocol, or may be negotiated between the base station and the UE.

When the UE receives the physical layer parameter information carried in the system message and the physical layer parameter information carried in the RRC connection release message at the same time, the UE may select the physical layer parameter information with a higher priority to determine the QCL parameter.

For example, if the UE leaving the connected state is released to the current serving cell, and both the system message and the RRC connection release message carry physical layer parameter information for the UE in an idle state and/or the UE in an inactive state, such as the physical layer parameter information indicating the QCL parameter, and the priority of the physical layer parameter information carried in the RRC connection release message is higher than the physical layer parameter information carried in the system message, then, the UE may determine the SSB having the QCL relationship with the TRS/CSI-RS with reference to the QCL relationship indicated by the QCL parameter carried in the RRC connection release message.

In some embodiments, in response to the UE being released to a serving cell and not receiving the physical layer parameter information, the UE may determine the first physical layer parameter based on a second physical layer parameter used by the UE when in a connected state to receive the TRS and/or the CSI-RS.

The second physical layer parameter may include, but is not limited to: a QCL parameter indicating a QCL relationship and/or a QCL type of the UE in a connected state; and/or, an SCS parameter indicating the SCS for the UE in a connected state to receive the TRS and/or the CSI-RS.

When the base station does not use the physical layer parameter information to indicate the first physical layer parameter, the UE in a non-connected state uses the second physical layer parameter for the connected state as the first physical layer parameter.

For example, the UE enters an idle state or an inactive state in the serving cell, and determines the SSB of the current QCL relationship of the current TRS and/or the CSI-RS according to the SSB in a connected state as a QCL relationship reference. For example, the SSB in a connected state is used as the SSB having a QCL relationship with the TRS and/or the CSI-RS.

The UE enters an idle state or an inactive state in the serving cell, and if the base station does not carry the SCS parameter in the RRC connection release message, then, the UE may consider that the same SCS as used when in a connected state is used for the idle state or the inactive state.

In some embodiment, sending an RRC connection release message includes: in response to the UE being released to a second SSB frequency point, where the second SSB frequency point is different from a first SSB frequency point of a serving cell, sending the RRC connection release message carrying the QCL parameter, where the QCL parameter is at least used for indicating an SSB of the second SSB frequency point having a QCL relationship with the TRS and/or the CSI-RS.

If the UE leaving the connected state is released to a new SSB frequency point, for example, the UE is released to a neighboring cell, the neighboring cell is not configured with a QCL relationship, the RRC connection release message may also carry a complete configuration, that is, a QCL parameter of the neighboring cell. An SSB having a QCL relationship with the TRS and/or the CSI-RS may be determined based on the QCL parameter.

For example, in the case of a TRS non-full cell beam configuration, the UE is released from a connected state to an idle state and is released to a neighboring cell. At this time, the base station may carry the QCL parameter of the neighboring cell through the RRC connection release message by means of the UE. The UE may determine, based on the QCL parameter, the SSB having a QCL relationship with the TRS and/or the CSI-RS in the neighboring cell, that is, the SSB of the second frequency point.

In some embodiments, in response to the UE being released to a second SSB frequency point and not receiving the physical layer parameter information, where the second SSB frequency point is different from a first SSB frequency point of a serving cell, the UE may determine a QCL correspondence relationship based on an SSB detected by the UE at the second SSB frequency point.

If the UE leaving the connected state is released to a new SSB frequency point, for example, the UE is released to a neighboring cell, the neighboring cell is not configured with a QCL relationship, and the RRC connection release message does not carry the QCL parameter of the neighboring cell either, the UE may obtain the currently tracked SSB through measurement, and use it as a reference for the QCL relationship.

For example, in the case of a TRS non-full cell beam configuration, the UE is released from a connected state to an idle state and is released to a neighboring cell. At this time, the base station does not send the QCL parameter of the neighboring cell. The UE may search in the neighboring cell and determine an SSB having a QCL relationship with the TRS and/or the CSI-RS.

In some embodiments, the method further includes at least one of the following:

in response to the UE being released to a serving cell, the UE may determine the first physical layer parameter based on a second physical layer parameter used by the UE when in a connected state to receive the TRS and/or the CSI-RS;

in response to the UE being released to a second SSB frequency point, where the second SSB frequency point is different from a first SSB frequency point of a serving cell, the UE may determine the first physical layer parameter based on an SSB detected by the UE at the second SSB frequency point.

When the UE is released from a connected state to a non-connected state, the UE may select the physical layer parameter by itself without depending on the physical layer parameter information sent by the base station.

If the UE is released to a serving cell, the UE may determine the second physical layer parameter used in the connected state as the first physical layer parameter used in the non-connected state.

For example, the UE is released to a serving cell, whether receiving the physical layer parameter information or not, the UE may use the QCL parameter used in a connected state as the QCL parameter used in a non-connected state, and/or use the SCS parameter used in a connected state as the SCS parameter used in a non-connected state. For example, based on the QCL relationship used in the connected state, an SSB having a QCL relationship with the TRS and/or the CSI-RS is determined. Based on the SCS of the SSB used in a connected state, the SCS of the SSB used in a non-connected state is determined.

If the UE is released to a second frequency point, such as a neighboring cell, the UE may obtain the currently tracked SSB through measurement at the second frequency point, and use it as a reference for the QCL relationship.

As shown in FIG. 3, the present exemplary embodiment provides a method for information transmission, which may be performed by a UE of a cellular mobile communication system or the like, and includes the following.

In step 301, based on received physical layer parameter information of a TRS and/or a CSI-RS and a frequency point to which a UE is released when transitioning from a connected state to a non-connected state, a first physical layer parameter used by the UE when in the non-connected state to receive the TRS and/or the CSI-RS.

Here, the UE may be a mobile phone terminal that performs wireless communication using a cellular mobile communication technology, etc. The base station may be a communication device that provides an access network interface to the UE in a cellular mobile communication system. The UE may be a UE in an idle state or an inactive state.

Here, the UE in a non-connected state includes: a UE in an RRC connection idle state and/or a UE in an inactive state. The TRS and/or the CSI-RS may be shared by a UE in a non-connected state and/or a UE in a connected state. The UE in an idle state and/or the UE in an inactive state may monitor the TRS and/or the CSI-RS at a TRS and/or CSI-RS occasion with the UE in a connected state.

For example, the UE in an idle state and/or the UE in an inactive state may perform downlink synchronization based on the monitored TRS and/or CSI-RS.

The base station may carry the physical layer parameter information in existing signaling and send it to the UE. The base station may also carry the physical layer parameter information in dedicated information and send it to the UE.

The first physical layer parameter may be a channel physical feature of a wireless channel for carrying a TRS and/or a CSI-RS between a base station and a UE in a non-connected state, such as a channel bandwidth, etc. The UE in a non-connected state may determine a channel physical feature for transmitting the TRS and/or the CSI-RS based on the first physical layer parameter, and receive the TRS and/or the CSI-RS based on the channel physical feature.

The first physical layer parameter may be consistent with a TRS and/or CSI-RS physical layer parameter configured by the base station for the UE in a connected state, or may not be consistent.

In some embodiments, the first physical layer parameter includes a QCL parameter, where the QCL parameter is used for indicating an SSB having a QCL relationship with the TRS and/or the CSI-RS, and/or a QCL type.

and/or, an SCS parameter indicating an SCS.

The QCL parameter may indicate an SSB having a QCL relationship with the TRS and/or the CSI-RS.

Signals sent from two different antenna ports may encounter wireless channels with common characteristics, in which case the antenna port is referred to as being QCL. The signals sent from these two different antenna ports may be referred to as having a QCL relationship. If the two antenna ports are QCL, the channel feature of the signal transmitted on one antenna port may be inferred from the channel feature of the signal transmitted on the other antenna port. If the TRS and/or the CSI-RS have a QCL relationship with the SSB, that is, the antenna port that sends the TRS and/or the CSI-RS and the antenna port that sends the SSB are QCL, then the channel feature of the TRS and/or the CSI-RS may be inferred according to the channel feature of the SSB.

The QCL parameter may also indicate a QCL type of the QCL relationship, such as QCL-TypeA, QCL-TypeB, QCL- TypeC, and QCL-TypeD. Different QCL types indicate channel features corresponding to different QCL relationships. For example, QCL-TypeA indicates that there is a QCL relationship on the characteristics of Doppler frequency shift, Doppler propagation, average delay, and delay extension.

For example, the UE may determine an SSB having a QCL relationship with the TRS and/or the CSI-RS according to the QCL parameter, and determine a specific channel feature having a QCL relationship with the SSB based on the QCL type. In this way, the channel feature of the TRS and/or the CSI-RS may be determined. And then, the TRS and/or the CSI-RS is received based on the determined channel feature.

In some embodiments, the QCL type may also be specified by a communication protocol or the like to use a fixed type. In this way, the UE may need to know the SSB having the QCL relationship, and may determine the channel physical feature of the TRS and/or the CSI-RS based on the specified QCL type. The QCL parameter may not include the QCL type.

The SCS parameter may indicate a specific SCS of a TRS and/or a CSI-RS. For example, the SCS parameter may indicate that the SCS is 15 kHz. The UE may directly determine the SCS according to the SCS parameter.

The SCS parameters may also indicate that the UE determines the SCS of the TRS and/or the CSI-RS based on other association information. For example, the SCS parameter may indicate the SCS of the SSB. The UE may determine the SCS of the TRS and/or the CSI-RS based on the SCS of the SSB.

The UE in a non-connected state may receive the TRS and/or the CSI-RS based on the first physical layer parameter, and perform downlink synchronization based on the TRS and/or the CSI-RS. Compared with performing synchronization through a plurality of SSBs, the synchronization duration can be reduced, thus saving the power.

In this way, the UE may determine, based on the received physical layer parameter information, a first physical layer parameter for receiving the TRS and/or the CSI-RS in a non-connected state, realizing that the TRS and/or the CSI-RS are received in the non-connected state. On one hand, the base station may respectively configure the TRS and/or CSI-RS physical layer parameters for the UE in the connected state and the UE in the non-connected state, improving the configuration flexibility of base station. On the other hand, the TRS and/or the CSI-RS are received based on the first physical layer parameter, improving the receiving success rate, and improving the receiving efficiency for the TRS and/or the CSI-RS.

When the UE is released from the connected state to the non-connected state, the base station may release the UE to a serving cell or a neighboring cell according to the signal coverage condition of the UE. Here, the frequency points of the serving cell or the neighboring cell may be different.

The physical layer parameter indicated by the physical layer parameter information sent by the base station may correspond to a serving cell, or may also correspond to a neighboring cell. The UE may determine, based on the released frequency point, whether to use the physical layer parameter indicated by the physical layer parameter information. When the base station does not send the physical layer parameter information, the UE may also determine the physical layer parameter based on the regulations of the communication protocol or the like, and then receive the TRS and/or the CSI-RS.

In this way, the UE may determine, based on the received physical layer parameter information and the frequency point that the UE is released, the first physical layer parameter for receiving the TRS and/or the CSI-RS in a non-connected state, realizing that the TRS and/or the CSI-RS are received in the non-connected state, so that the determined first physical layer parameter may satisfy that it is released to the frequency point.

In some embodiments, the received physical layer parameter information of the TRS and/or the CSI-RS includes:

physical layer parameter information carried in a received system message, and/or physical layer parameter information carried in a received RRC connection release message.

An RRC connection release message is sent, where the RRC connection release message carries the physical layer parameter information.

The UE may receive a system message when in a connected state or a non-connected state, and obtain the physical layer parameter information from the system message.

For example, if the UE leaving the connected state is released to the current serving cell, the system information of the serving cell may carry the physical layer parameter information at least for the UE in an idle state and/or the UE in an inactive state, such as the physical layer parameter information indicating the QCL parameter. The physical layer parameter information may be used for indicating a QCL relationship configuration table of the TRS/CSI-RS and the SSB of the serving cell, and the QCL relationship of the SSB indicated by the QCL parameter is a reference. Here, the QCL relationship of the SSB indicated by the QCL parameter may also be used for the UE in a connected state. In this way, the UE in a non-connected state may use the QCL relationship of the SSB of the UE in a connected state as a reference.

The UE may receive the RRC connection release message when transitioning from a connected state to a non-connected state, and obtain the physical layer parameter information from the RRC connection release message.

For example, when the RRC connection release message sent by the base station to the UE carries the physical layer parameter information indicating the SCS parameter of the SSB, for example, the SCS parameter may use a field of ssbSubcarrierSspacing, and then, the UE released into an idle state may determine the SCS used by the UE in an idle state based on the SCS parameter. The SCS indicated by the SCS parameter may be the same as the SCS of the SSB configured in the connected state, or may be different.

In some embodiments, based on the received physical layer parameter information of the TRS and/or the CSI-RS and the frequency point to which the UE is released when transitioning from a connected state to a non-connected state, determining the first physical layer parameter used by the UE when in the non-connected state to receive the TRS and/or the CSI-RS, includes:

in response to the UE being released to a serving cell, determining the QCL parameter based on the physical layer parameter information carried in the system message and/or the physical layer parameter information carried in the RRC connection release message, where the QCL parameter is at least used for indicating an SSB of the serving cell having a QCL relationship with the TRS and/or the CSI-RS.

For example, if the UE leaving the connected state is released to the current serving cell, the RRC connection release message may be used to carry the physical layer parameter information for the UE in an idle state and/or the UE in an inactive state, such as the physical layer parameter information indicating the QCL parameter. The QCL parameter may be used for indicating a QCL relationship configuration table of the TRS/CSI-RS and the SSB of the serving cell, and the UE may determine the SSB having the QCL relationship with the TRS/CSI-RS with reference to the QCL relationship indicated by the QCL parameter carried in the RRC connection release message.

In some embodiments, determining the QCL parameter based on the physical layer parameter information carried in the system message and the physical layer parameter information carried in the RRC connection release message includes:

selecting one of the physical layer parameter information carried in the system message and the physical layer parameter information carried in the RRC connection release message based on the priority of the physical layer parameter information carried in the system message and the priority of the physical layer parameter information carried in the RRC connection release message, and determining the QCL parameter.

The physical layer parameter information carried in the system message and the physical layer parameter information carried in the RRC connection release message may be the same or different.

The physical layer parameter information carried in the system message may indicate a QCL parameter corresponding to the UE in a connected state and/or the UE in a non-connected state. The QCL parameter corresponding to the UE in a connected state and the QCL parameter corresponding to the UE in a non-connected state may be the same or different.

The physical layer parameter information carried in the RRC connection release message may be used for the QCL parameter corresponding to the UE in a non-connected state.

The priority of the physical layer parameter information carried in the system message and the priority of the physical layer parameter information carried in the RRC connection release message may be specified through the communication protocol, or may be negotiated between the base station and the UE.

When the UE receives the physical layer parameter information carried in the system message and the physical layer parameter information carried in the RRC connection release message at the same time, the UE may select the physical layer parameter information with a higher priority to determine the QCL parameter.

For example, if the UE leaving the connected state is released to the current serving cell, and both the system message and the RRC connection release message carry physical layer parameter information for the UE in an idle state and/or the UE in an inactive state, such as the physical layer parameter information indicating the QCL parameter, and the priority of the physical layer parameter information carried in the RRC connection release message is higher than the physical layer parameter information carried in the system message, then, the UE may determine the SSB having a QCL relationship with the TRS/CSI-RS with reference to the QCL relationship indicated by the QCL parameter carried in the RRC connection release message.

In some embodiments, based on the received physical layer parameter information of the TRS and/or the CSI-RS and the frequency point to which the UE is released when transitioning from the connected state to the non-connected state, determining the first physical layer parameter used by the UE when in the non-connected state to receive the TRS and/or the CSI-RS, includes:

in response to the UE being released to a serving cell and not receiving the physical layer parameter information, determining the first physical layer parameter based on a second physical layer parameter used by the UE when in a connected state to receive the TRS and/or the CSI-RS.

The second physical layer parameter may include, but is not limited to: a QCL parameter indicating a QCL relationship and/or a QCL type of the UE in a connected state; and/or, an SCS parameter indicating the SCS for the UE in a connected state to receive the TRS and/or the CSI-RS.

When the base station does not use the physical layer parameter information to indicate the first physical layer parameter, the UE in a non-connected state uses the second physical layer parameter for the connected state as the first physical layer parameter.

For example, the UE enters an idle state or an inactive state in the serving cell, and determines the SSB of the current QCL relationship of the current TRS and/or the CSI-RS according to the SSB in a connected state as a QCL relationship reference. For example, the SSB in a connected state is used as the SSB having a QCL relationship with the TRS and/or the CSI-RS.

The UE enters an idle state or an inactive state in a serving cell. If the base station does not carry the SCS parameter in the RRC connection release message, the UE may consider that the same SCS as used when in a connected state is used for the idle state or the inactive state.

In some embodiments, based on the received physical layer parameter information of the TRS and/or the CSI-RS and the frequency point to which the UE is released when transitioning from the connected state to the non-connected state, determining the first physical layer parameter used by the UE when in the non-connected state to receive the TRS and/or the CSI-RS, includes:

in response to the UE being released to a second SSB frequency point, where the second SSB frequency point is different from a first SSB frequency point of a serving cell, determining the QCL parameter based on the physical layer parameter information carried in the RRC connection release message, where the QCL parameter is at least used for indicating an SSB of the second SSB frequency point having a QCL relationship with the TRS and/or the CSI-RS.

If the UE leaving the connected state is released to a new SSB frequency point, for example, the UE is released to a neighboring cell, the neighboring cell is not configured with a QCL relationship, the RRC connection release message may also carry a complete configuration, that is, a QCL parameter of the neighboring cell. An SSB having a QCL relationship with the TRS and/or the CSI-RS may be determined based on the QCL parameter.

For example, in the case of a TRS non-full cell beam configuration, the UE is released from a connected state to an idle state and is released to a neighboring cell. At this time, the base station may carry the QCL parameter of a neighboring cell through the RRC connection release message by means of the UE. The UE may determine, based on the QCL parameter, the SSB having a QCL relationship with the TRS and/or the CSI-RS in the neighboring cell, that is, the SSB of the second frequency point.

In some embodiments, based on the received physical layer parameter information of the TRS and/or the CSI-RS and the frequency point to which the UE is released when transitioning from the connected state to the non-connected state, determining the first physical layer parameter used by the UE when in the non-connected state to receive the TRS and/or the CSI-RS, includes:

in response to the UE being released to a second SSB frequency point and not receiving the physical layer parameter information, where the second SSB frequency point is different from a first SSB frequency point of a serving cell, determining a QCL correspondence relationship based on an SSB detected by the UE at the second SSB frequency point.

If the UE leaving the connected state is released to a new SSB frequency point, for example, the UE is released to a neighboring cell, the neighboring cell is not configured with a QCL relationship, and the RRC connection release message does not carry the QCL parameter of the neighboring cell either, the UE may obtain the currently tracked SSB through measurement, and use it as a reference for the QCL relationship.

For example, in the case of a TRS non-full cell beam configuration, the UE is released from a connected state to an idle state and is released to a neighboring cell. At this time, the base station does not send the QCL parameter of the neighboring cell. The UE may search in the neighboring cell and determine an SSB having a QCL relationship with the TRS and/or the CSI-RS.

In some embodiments, the method further includes at least one of the following:

in response to the UE being released to a serving cell, determining the first physical layer parameter based on a second physical layer parameter used by the UE when in a connected state to receive the TRS and/or the CSI-RS;

in response to the UE being released to a second SSB frequency point, where the second SSB frequency point is different from a first SSB frequency point of a serving cell, determining the first physical layer parameter based on an SSB detected by the UE at the second SSB frequency point.

When the UE is released from a connected state to a non-connected state, the UE may select the physical layer parameter by itself without depending on the physical layer parameter information sent by the base station.

If the UE is released to a serving cell, the UE may determine the second physical layer parameter used in the connected state as the first physical layer parameter used in the non-connected state.

For example, the UE is released to a serving cell, whether receiving the physical layer parameter information or not, the UE may use the QCL parameter used in a connected state as the QCL parameter used in a non-connected state, and/or use the SCS parameter used in a connected state as the SCS parameter used in a non-connected state. For example, based on the QCL relationship used in the connected state, an SSB having the QCL relationship with the TRS and/or the CSI-RS is determined. Based on the SCS of the SSB used in a connected state, the SCS of the SSB used in a non-connected state is determined.

If the UE is released to a second frequency point, such as a neighboring cell, the UE may obtain the currently tracked SSB through measurement at the second frequency point, and use it as a reference for the QCL relationship.

A specific example is provided below in combination with any of the above embodiments.

The present example provides a new method for configuring a TRS/CSI-RS physical layer parameter to a UE in an idle state and/or a UE in an inactive state, where the physical layer parameter may include a QCL parameter and an SCS parameter.

If the UE leaving the connected state is released to the current serving cell, and when the system information of the serving cell is configured with configuration information of QCL at least for the UE in an idle state and/or the UE in an inactive state, i.e., physical layer parameter information, the configuration information including a QCL relationship configuration table corresponding to the TRS/CSI-RS and the SSB of the serving cell, and the RRC connection release message does not carry the QCL parameter, then the UE uses the QCL relationship of the SSB in the connected state as a reference.

If the UE leaving the connected state is released to the current serving cell, and the RRC connection release message carries the QCL configuration corresponding to the SSB, then the QCL of the corresponding SSB that the RRC connection release message carries the QCL configuration information is taken as the basis.

If the UE leaving the connected state is released to the current serving cell, and the system information of the serving cell is configured with no QCL configuration, then the RRC release message may also carry a complete configuration and specify an SSB having the QCL relationship with the TRS/CSI-RS.

If the UE leaving the connected state is released to a new SSB frequency point (e.g., a neighboring cell), then the UE obtains the actually transmitted SSB through reading the system information and obtains the currently tracked SSB through measurement, using it as a reference for the QCL relationship.

If the UE leaving the connected state is released to a new SSB frequency point (e.g., a neighboring cell), however the cell is not configured with the QCL relationship, the RRC release message may also carry a complete configuration by taking the QCL of the corresponding SSB that the RRC connection release message carries the QCL configuration information as the basis. For example, in the case of a TRS non-full cell beam configuration, the UE may be according to the QCL of the SSB corresponding to the QCL configuration information carried in the RRC connection release message.

The UE enters the IDLE/INACTIVE state in the present cell, and all uses the SSB in the connected state as a reference for the QCL relationship. The UE enters the IDLE/INACTIVE state in the neighboring cell, and automatically searches for the SSB for determining the QCL relationship.

When the RRC connection release message sent by the base station to the UE carries the SCS information of the SSB, i.e., ssbSubCarerspacing, the SCS of the TRS configuration obtained by the UE released into an idle state is defaulted to be the same as the SCS indicated by the SCS information carried in the RRC connection release message. The SCS information may be configured with different SSB SCS from the connected state. If the RRC connection release message does not carry the information element (IE), the UE considers that the SCS the same as the SSB measured in the connected state does not need to be added with SCS information of the TRS/CSI-RS.

According to some embodiments of the present disclosure, there is further provided an apparatus for information transmission, which may be applied to a base station in wireless communication. As shown in FIG. 4, the apparatus for information transmission 100 includes a sending module 110.

The sending module is configured to send physical layer parameter information of a TRS and/or a CSI-RS, where the physical layer parameter information is used for indicating a first physical layer parameter used by a user equipment (UE) in a non-connected state when receiving the TRS and/or the CSI-RS.

In some embodiments, the first physical layer parameter includes:

a QCL parameter, where the QCL parameter is used for indicating a QCL relationship between the TRS and/or the CSI-RS with an SSB, and/or a QCL type; and/or, an SCS parameter indicating an SCS.

In some embodiments, the sending module 110 includes at least one of a first sending submodule 111 and a second sending submodule 112.

The first sending submodule 111 is configured to send a system message, where the system message carries the physical layer parameter information.

The second sending submodule 112 is configured to send an RRC connection release message, where the RRC connection release message carries the physical layer parameter information.

In some embodiments, the second sending submodule 112 includes a first sending unit 1121.

The first sending unit 1121 is configured to send the RRC connection release message carrying the QCL parameter in response to the UE being released to a serving cell, where the QCL parameter is at least used for indicating an SSB of the serving cell having the QCL relationship with the TRS and/or the CSI-RS.

In some embodiments, the second sending submodule 112 includes a second sending unit 1122.

The second sending unit 1122 is configured to send the RRC connection release message carrying the QCL parameter in response to the UE being released to a second SSB frequency point, where the second SSB frequency point is different from a first SSB frequency point of a serving cell, and the QCL parameter is at least used for indicating an SSB of the second SSB frequency point having the QCL relationship with the TRS and/or the CSI-RS.

Figure 5:
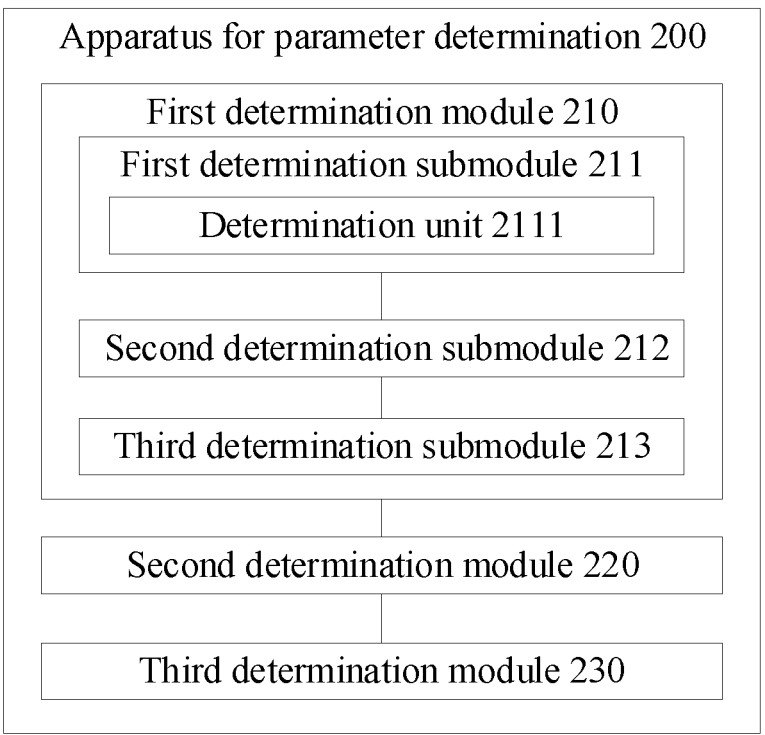
FIG. 5 is a block diagram of an apparatus for parameter determination according to some embodiments of the present disclosure.

Some embodiments According to some embodiments of the present disclosure, there is further provided an apparatus for parameter determination, which may be applied to a UE in wireless communication. As shown in FIG. 5, the apparatus for parameter determination 200 includes a first determination module 210.

The first determination module 210 is configured to determine, based on received physical layer parameter information of a TRS and/or a CSI-RS and a frequency point to which a UE is released when transitioning from a connected state to a non-connected state, a first physical layer parameter used by the UE when in the non-connected state to receive the TRS and/or the CSI-RS.

In some embodiments, the first physical layer parameter includes a QCL parameter, where the QCL parameter is used for indicating an SSB having a QCL relationship with the TRS and/or the CSI-RS, and/or a QCL type; and/or, an SCS parameter indicating an SCS.

In some embodiments, the received physical layer parameter information of the TRS and/or the CSI-RS includes:

the physical layer parameter information carried in a received system message and/or the physical layer parameter information carried in a received RRC connection release message.

In some embodiments, the first determination module 210 includes a first determination submodule.

The first determination submodule 211 is configured to determine the QCL parameter based on the physical layer parameter information carried in the system message and/or the physical layer parameter information carried in the RRC connection release message in response to the UE being released to a serving cell, where the QCL parameter is at least used for indicating an SSB of the serving cell having a QCL relationship with the TRS and/or the CSI-RS.

In some embodiments, the first determination submodule 211 includes a determination unit 2111.

The determination unit 2111 is configured to select one of the physical layer parameter information carried in the system message and the physical layer parameter information carried in the RRC connection release message based on a priority of the physical layer parameter information carried in the system message and a priority of the physical layer parameter information carried in the RRC connection release message, and determine the QCL parameter.

In some embodiments, the first determination module 210 includes a second determination submodule.

The second determination submodule 212 is configured to determine the QCL parameter based on the physical layer parameter information carried in the RRC connection release message in response to the UE being released to a second SSB frequency point, where the second SSB frequency point is different from a first SSB frequency point of a serving cell, and the QCL parameter is at least used for indicating an SSB of the second SSB frequency point having the QCL relationship with the TRS and/or the CSI-RS.

In some embodiments, the first determination module 210 includes a third determination submodule.

The third determination submodule 213 is configured to determine the first physical layer parameter based on a second physical layer parameter used by the UE when in the connected state to receive the TRS and/or the CSI-RS in response to the UE being released to a serving cell and not receiving the physical layer parameter information.

In some embodiments, the first determination module 210 includes fourth determination submodule.

The fourth determination submodule 214 is configured to determine, in response to the UE being released to a second SSB frequency point and not receiving the physical layer parameter information, a QCL correspondence relationship based on an SSB detected by the UE at the second SSB frequency point, where the second SSB frequency point is different from a first SSB frequency point of a serving cell.

In some embodiments, the apparatus 200 further includes at least one of a second determination module 220 and a third determination module 230.

The second determination module 220 is configured to determine the first physical layer parameter based on a second physical layer parameter used by the UE when in the connected state to receive the TRS and/or the CSI-RS in response to the UE being released to a serving cell.

The third determination module 230 is configured to determine, in response to the UE being released to a second SSB frequency point, the first physical layer parameter based on an SSB detected by the UE at the second SSB frequency point, where the second SSB frequency point is different from a first SSB frequency point of a serving cell.

In some embodiments, the sending module 110, the first determination module 210, the second determination module 220, and the third determination module 230 may be implemented by one or more central processing units (CPU), graphics processing units (GPU), baseband processors (BP), application specific integrated circuits (ASIC), DSP, programmable logic devices (PLD), complex programmable logic devices (CPLD), field-programmable gate arrays (FPGA), general-purpose processors, controllers, micro controller units (MCU), microprocessors, or other electronic components, for performing the foregoing method.

Figure 6:
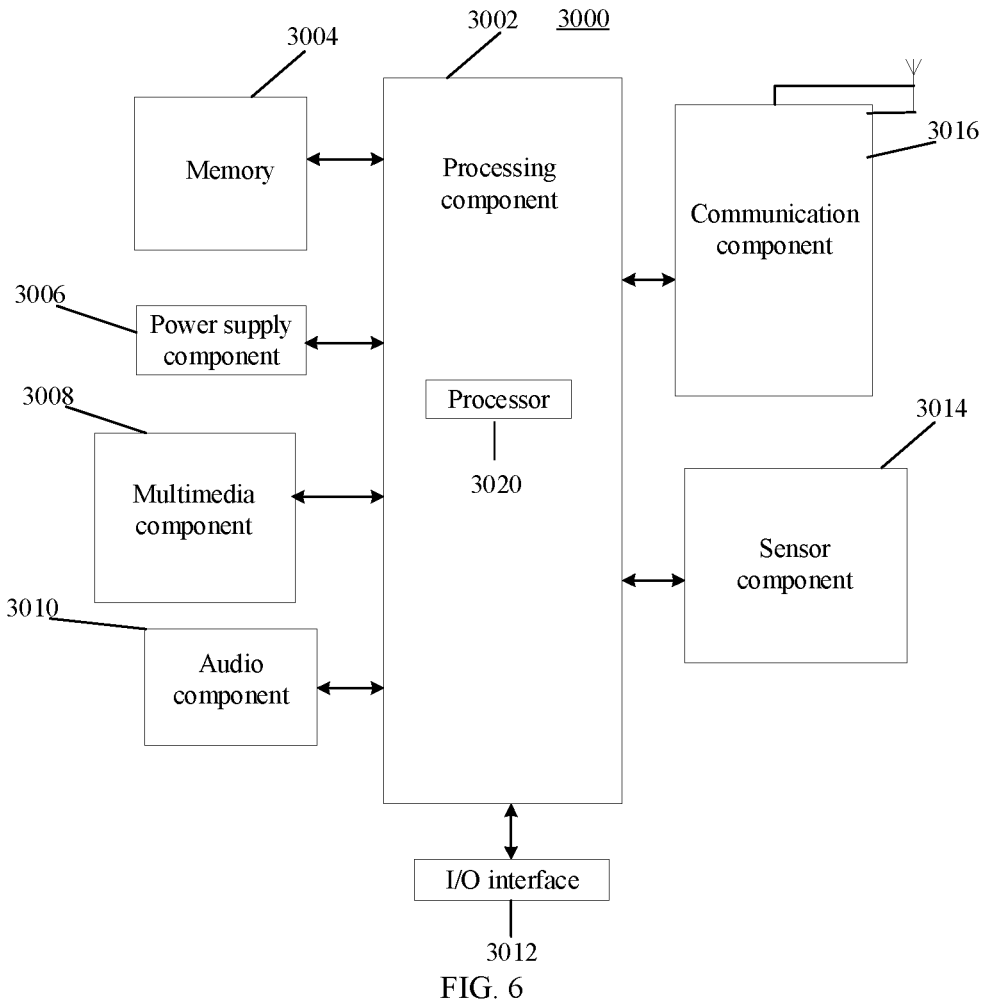
FIG. 6 is a block diagram of an apparatus for information transmission or parameter determination according to some embodiments of the present disclosure.

FIG. 6 is a block diagram of an apparatus for information transmission or parameter determination 3000 according to some embodiments of the present disclosure. For example, the apparatus 3000 may be a mobile phone, a computer, a digital broadcast terminal, a messaging device, a game console, a tablet device, a medical device, a fitness device, a personal digital assistant, etc.

Referring to FIG. 6, the apparatus 3000 may include one or more of the following components: a processing component 3002, a memory 3004, a power supply component 3006, a multimedia component 3008, an audio component 3010, an input/output (I/O) interface 3012, a sensor component 3014, and a communication component 3016.

The processing component 3002 generally controls the overall operation of the apparatus 3000, such as operations associated with display, telephone call, data communication, camera operation, and recording operation. The processing component 3002 may include one or more processors 3020 to execute instructions, so as to complete all or some of the steps of the foregoing method. In addition, the processing component 3002 may include one or more modules to facilitate interaction between the processing component 3002 and other components. For example, the processing component 3002 may include a multimedia module to facilitate interaction between the multimedia component 3008 and the processing component 3002.

The memory 3004 is configured to store various types of data to support operation at the apparatus 3000. Examples of such data include instructions for any application or method operated on apparatus 3000, contact data, phonebook data, messages, pictures, videos, and the like. The memory 3004 may be implemented by any type of volatile or non-volatile storage device or a combination of them, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power supply component 3006 provides electrical power to various components of the apparatus 3000. The power supply component 3006 may include a power management system, one or more power sources, and other components associated with generating, managing, and distributing power for apparatus 3000.

The multimedia component 3008 includes a screen providing an output interface between the apparatus 3000 and a user. In some embodiments, the screen may include a liquid crystal display (LCD) and a touch panel (TP). If the screen includes a touch panel, the screen may be implemented as a touch screen to receive an input signal from the user. The touch panel includes one or more touch sensors to sense touches, sliding, and gestures on the touch panel. The touch sensor may not only sense the boundary of the touch or sliding action, but also detect the duration and pressure associated with the touch or sliding action. In some embodiments, the multimedia component 3008 includes a front-facing camera and/or a rear-facing camera. When the apparatus 3000 is in an operation mode, such as a photographing mode or a video mode, the front-facing camera and/or the rear-facing camera may receive external multimedia data.

Each front-facing camera and rear-facing camera may be a fixed optical lens system or have a focal length and an optical zoom capability.

The audio component 3010 is configured to output and/or input an audio signal. For example, the audio component 3010 includes a microphone (MIC) configured to receive an external audio signal when the apparatus 3000 is in an operating mode, such as a call mode, a recording mode, and a speech recognition mode. The received audio signal may be further stored in the memory 3004 or transmitted via the communication component 3016. In some embodiments, the audio component 3010 further includes a speaker configured to output an audio signal.

The I/O interface 3012 provides an interface between the processing component 3002 and the peripheral interface module, and the peripheral interface module may be a keyboard, a click wheel, a button, or the like. The buttons may include, but are not limited to, a home button, a volume button, a start button, and a lock button.

The sensor component 3014 includes one or more sensors for providing status assessments of various aspects for the apparatus 3000. For example, the sensor component 3014 may detect the open/closed state of the apparatus 3000, the relative positioning of the components, for example, the components are the display and the keypad of the apparatus 3000. The sensor component 3014 may also detect the position change of the apparatus 3000 or a component of the apparatus 3000, the presence or absence of contact between the user and the apparatus 3000, orientation or acceleration/deceleration of the apparatus 3000, and the temperature change of the apparatus 3000. The sensor component 3014 may include a proximity sensor configured to detect the presence of nearby objects without any physical contact. The sensor component 3014 may also include a light sensor, such as a CMOS or CCD image sensor, for use in an imaging application. In some embodiments, the sensor component 3014 may further include an acceleration sensor, a gyroscope sensor, a magnetic sensor, a pressure sensor, or a temperature sensor.

The communication component 3016 is configured to facilitate wired or wireless communication between the apparatus 3000 and other devices. The apparatus 3000 may access a wireless network based on a communication standard, such as Wi-Fi, 2G, or 3G, or a combination of them. In some embodiments, the communication component 3016 receives broadcast signals or broadcast related information from an external broadcast management system via a broadcast channel. In some embodiments, the communication component 3016 also includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the apparatus 3000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components for performing the methods described above.

In some embodiments, there is further provided a nontransitory computer-readable storage medium including instructions, for example, the memory 3004 including instructions. The instructions may be executed by the processor 3020 of the apparatus 3000 to complete the foregoing method. For example, the non-transitory computer-readable storage medium may be a ROM, a random access memory (RAM), a CD-ROM, a magnetic tape, a floppy disk, an optical data storage device, etc.

Embodiments of the present disclosure provide a method for information transmission, a method for parameter determination, an apparatus, a communication device, and a storage medium.

According to a first aspect of the embodiments of the present disclosure, there is provided a method for information transmission, where the method is performed by a base station, and includes:

sending physical layer parameter information of a TRS and/or a CSI-RS, where the physical layer parameter information is used for indicating a first physical layer parameter used by a user equipment (UE) in a non-connected state when receiving the TRS and/or the CSI-RS.

In some embodiments, the first physical layer parameter comprises:

a quasi-colocation (QCL) parameter, where the QCL parameter is used for indicating a QCL relationship between the TRS and/or the CSI-RS and a synchronization signals block (SSB), and/or a QCL type; and/or, an SCS parameter indicating a sub-carrier space (SCS).

In some embodiments, sending physical layer parameter information of a TRS and/or a CSI-RS comprises at least one of:

sending a system message, where the system message carries the physical layer parameter information; or sending a radio resource control (RRC) connection release message, where the RRC connection release message carries the physical layer parameter information.

In some embodiments, sending an RRC connection release message includes:

sending the RRC connection release message carrying the QCL parameter in response to the UE being released to a serving cell, where the QCL parameter is at least used for indicating an SSB of the serving cell having a QCL relationship with the TRS and/or the CSI-RS.

In some embodiments, sending an RRC connection release message includes:

sending the RRC connection release message carrying the QCL parameter in response to the UE being released to a second SSB frequency point, where the second SSB frequency point is different from a first SSB frequency point of a serving cell, and the QCL parameter is at least used for indicating an SSB of the second SSB frequency point having a QCL relationship with the TRS and/or the CSI-RS.

According to a second aspect of the embodiments of the present disclosure, there is provided a method for parameter determination, where the method is performed by a user equipment (UE), and includes:

determining, based on received physical layer parameter information of a TRS and/or a CSI-RS and a frequency point to which the UE is released when transitioning from a connected state to a non-connected state, a first physical layer parameter used by the UE when in the non-connected state to receive the TRS and/or the CSI-RS.

In some embodiments, the first physical layer parameter includes a QCL parameter, where the QCL parameter is used for indicating a synchronization signals block (SSB) having a QCL relationship with the TRS and/or the CSI-RS, and/or a QCL type; and/or, an SCS parameter indicating an SCS.

In some embodiments, the received physical layer parameter information of the TRS and/or the CSI-RS includes:

the physical layer parameter information carried in a received system message, and/or the physical layer parameter information carried in a received radio resource control (RRC) connection release message.

In some embodiments, determining, based on received physical layer parameter information of a TRS and/or a CSI-RS and a frequency point to which the UE is released when transitioning from a connected state to a non-connected state, a first physical layer parameter used by the UE when in the non-connected state to receive the TRS and/or the CSI-RS, includes:

determining the QCL parameter based on the physical layer parameter information carried in the system message and/or the physical layer parameter information carried in the RRC connection release message in response to the UE being released to a serving cell, where the QCL parameter is at least used for indicating an SSB of the serving cell having a QCL relationship with the TRS and/or the CSI-RS.

In some embodiments, determining the QCL parameter based on the physical layer parameter information carried in the system message and the physical layer parameter information carried in the RRC connection release message includes:

selecting one of the physical layer parameter information carried in the system message and the physical layer parameter information carried in the RRC connection release message based on a priority of the physical layer parameter information carried in the system message and a priority of the physical layer parameter information carried in the RRC connection release message, and determining the QCL parameter.

In some embodiments, determining, based on received physical layer parameter information of a TRS and/or a CSI-RS and a frequency point to which the UE is released when transitioning from a connected state to a non-connected state, a first physical layer parameter used by the UE when in the non-connected state to receive the TRS and/or the CSI-RS, includes:

determining the QCL parameter based on the physical layer parameter information carried in the RRC connection release message in response to the UE being released to a second SSB frequency point, where the second SSB frequency point is different from a first SSB frequency point of a serving cell, and the QCL parameter is at least used for indicating an SSB of the second SSB frequency point having a QCL relationship with the TRS and/or the CSI-RS.

In some embodiments, determining, based on received physical layer parameter information of a TRS and/or a CSI-RS and a frequency point to which the UE is released when transitioning from a connected state to a non-connected state, a first physical layer parameter used by the UE when in the non-connected state to receive the TRS and/or the CSI-RS, includes:

determining the first physical layer parameter based on a second physical layer parameter used by the UE when in the connected state to receive the TRS and/or the CSI-RS in response to the UE being released to a serving cell and not receiving the physical layer parameter information.

In some embodiments, determining, based on received physical layer parameter information of a TRS and/or a CSI-RS and a frequency point to which the UE is released when transitioning from a connected state to a non-connected state, a first physical layer parameter used by the UE when in the non-connected state to receive the TRS and/or the CSI-RS, includes:

determining, in response to the UE being released to a second SSB frequency point and not receiving the physical layer parameter information, a QCL correspondence relationship based on an SSB detected by the UE at the second SSB frequency point, where the second SSB frequency point is different from a first SSB frequency point of a serving cell.

In some embodiments, the method further includes at least one of:

determining the first physical layer parameter based on a second physical layer parameter used by the UE when in the connected state to receive the TRS and/or the CSI-RS in response to the UE being released to a serving cell; or determining, in response to the UE being released to a second SSB frequency point, the first physical layer parameter based on an SSB detected by the UE at the second SSB frequency point, where the second SSB frequency point is different from a first SSB frequency point of a serving cell.

According to a third aspect of the embodiments of the present disclosure, there is provided an apparatus for information transmission including a sending module, where, the sending module is configured to send physical layer parameter information of a tracking reference signal (TRS) and/or a channel state information reference signal (CSI-RS), where the physical layer parameter information is used for indicating a first physical layer parameter used by a user equipment (UE) in a non-connected state when receiving the TRS and/or the CSI-RS.

In some embodiments, the first physical layer parameter includes:

a QCL parameter, where the QCL parameter is used for indicating a QCL relationship between the TRS and/or the CSI-RS and a synchronization signals block (SSB), and/or a QCL type;

and/or an SCS parameter indicating an SCS.

In some embodiments, the sending module includes at least one of:

a first sending submodule, configured to send a system message, where the system message carries the physical layer parameter information; or a second sending submodule, configured to send a radio resource control (RRC) connection release message, where the RRC connection release message carries the physical layer parameter information.

In some embodiments, the second sending submodule includes:

a first sending unit, configured to send the RRC connection release message carrying the QCL parameter in response to the UE being released to a serving cell, where the QCL parameter is at least used for indicating an SSB of the serving cell having a QCL relationship with the TRS and/or the CSI-RS.

In some embodiments, the second sending submodule includes:

a second sending unit, configured to send the RRC connection release message carrying the QCL parameter in response to the UE being released to a second SSB frequency point, where the second SSB frequency point is different from a first SSB frequency point of a serving cell, and the QCL parameter is at least used for indicating an SSB of the second SSB frequency point having a QCL relationship with the TRS and/or the CSI-RS.

According to a fourth aspect of the embodiments of the present disclosure, there is provided an apparatus for parameter determination including a first determination module, where, the first determination module is configured to determine, based on received physical layer parameter information of a tracking reference signal (TRS) and/or a channel state information reference signal (CSI-RS) and a frequency point to which a UE is released when transitioning from a connected state to a non-connected state, a first physical layer parameter used by the UE when in the non-connected state to receive the TRS and/or the CSI-RS.

In some embodiments, the first physical layer parameter includes: a QCL parameter, where the QCL parameter is used for indicating a synchronization signals block (SSB) having a QCL relationship with the TRS and/or the CSI-RS, and/or a QCL type;

and/or, an SCS parameter indicating an SCS.

In some embodiments, the received physical layer parameter information of the TRS and/or the CSI-RS includes:

the physical layer parameter information carried in a received system message, and/or the physical layer parameter information carried in the received radio resource control (RRC) connection release message.

In some embodiments, the first determination module includes:

a first determination submodule, configured to determine the QCL parameter based on the physical layer parameter information carried in the system message and/or the physical layer parameter information carried in the RRC connection release message in response to the UE being released to a serving cell, where the QCL parameter is at least used for indicating an SSB of the serving cell having a QCL relationship with the TRS and/or the CSI-RS.

In some embodiments, the first determination submodule includes:

a determination unit, configured to select one of the physical layer parameter information carried in the system message and the physical layer parameter information carried in the RRC connection release message based on a priority of the physical layer parameter information carried in the system message and a priority of the physical layer parameter information carried in the RRC connection release message, and determine the QCL parameter.

In some embodiments, the first determination module includes:

a second determination submodule, configured to determine the QCL parameter based on the physical layer parameter information carried in the RRC connection release message in response to the UE being released to a second SSB frequency point, where the second SSB frequency point is different from a first SSB frequency point of a serving cell, and the QCL parameter is at least used for indicating an SSB of the second SSB frequency point having a QCL relationship with the TRS and/or the CSI-RS.

In some embodiments, the first determination module includes:

a third determination submodule, configured to determine the first physical layer parameter based on a second physical layer parameter used by the UE when in the connected state to receive the TRS and/or the CSI-RS in response to the UE being released to a serving cell and not receiving the physical layer parameter information.

In some embodiments, the first determination module includes:

a fourth determination submodule, configured to determine, in response to the UE being released to a second SSB frequency point and not receiving the physical layer parameter information, a QCL correspondence relationship based on an SSB detected by the UE at the second SSB frequency point, where the second SSB frequency point is different from a first SSB frequency point of a serving cell.

In some embodiments, the apparatus further includes at least one of:

a second determination module, configured to determine the first physical layer parameter based on a second physical layer parameter used by the UE when in the connected state to receive the TRS and/or the CSI-RS in response to the UE being released to a serving cell; or a third determination module, configured to determine, in response to the UE being released to a second SSB frequency point, the first physical layer parameter based on an SSB detected by the UE at the second SSB frequency point, where the second SSB frequency point is different from a first SSB frequency point of a serving cell.

According to a fifth aspect of the embodiments of the present disclosure, there is provided a communication device, including a processor, a memory, and an executable program stored on the memory and capable of being run by the processor, where, when the processor runs the executable program, steps of the method for information transmission in the first aspect or the method for parameter determination in the second aspect are performed.

According to a sixth aspect of the embodiments of the present disclosure, there is provided a storage medium with an executable program stored thereon, where, when the executable program is executed by a processor, steps of the method for information transmission in the first aspect or the method for parameter determination in the second aspect are implemented.

According to the method for information transmission, the apparatus, the communication device, and the storage medium provided in the embodiments of the present disclosure, a base station sends physical layer parameter information of a TRS and/or a CSI-RS, where the physical layer parameter information is used for indicating a first physical layer parameter used by a user equipment (UE) in a non-connected state when receiving the TRS and/or the CSI-RS. In this way, the UE may determine, based on the received physical layer parameter information, the first physical layer parameter for receiving the TRS and/or the CSI-RS in the non-connected state, realizing that the TRS and/or the CSI-RS are received in the non-connected state. On one hand, the base station may respectively configure the TRS and/or CSI-RS physical layer parameters for the UE in the connected state and the UE in the non-connected state, improving the configuration flexibility of the base station. On the other hand, the TRS and/or the CSI-RS are received based on the first physical layer parameter, improving the receiving success rate, and improving the receiving efficiency for the TRS and/or the CSI-RS.

Other implementations of the embodiments of the present disclosure will be apparent to those skilled in the art from consideration of the description and practice of the present disclosure here. This present disclosure is intended to cover any variations, uses, or adaptations of the embodiments of the present disclosure following the general principles of the embodiments of the present disclosure and including common general knowledge or conventional technical means in the art not disclosed in the embodiments of the present disclosure. The description and the embodiments are considered as exemplary.

It should be understood that the embodiments of the present disclosure are not limited to the precise structures that have been described above and illustrated in the accompanying drawings, and various modifications and changes may be made without departing from the scope of the embodiments of the present disclosure.

What is claimed is:

1. A method for information transmission, performed by a base station, comprising:

sending physical layer parameter information of a tracking reference signal (TRS) and/or a channel state information reference signal (CSI-RS), wherein the physical layer parameter information is used for indicating a first physical layer parameter used by a user equipment (UE) in a non-connected state when receiving the TRS and/or the CSI-RS to realize that the TRS and/or the CSI-RS are received in the non-connected state.

2. The method according to claim 1, wherein the first physical layer parameter comprises:

a quasi-colocation (QCL) parameter, wherein the QCL parameter is used for indicating a QCL relationship between the TRS and/or the CSI-RS and a synchronization signals block (SSB), and/or a QCL type; and/or, an SCS parameter indicating a sub-carrier space (SCS).

3. The method according to claim 2, wherein sending physical layer parameter information of a TRS and/or a CSI-RS comprises at least one of:

sending a system message, wherein the system message carries the physical layer parameter information; or sending a radio resource control (RRC) connection release message, wherein the RRC connection release message carries the physical layer parameter information.

4. The method according to claim 3, wherein sending an RRC connection release message comprises:

sending the RRC connection release message carrying the QCL parameter in response to the UE being released to a serving cell, wherein the QCL parameter is at least used for indicating an SSB of the serving cell having a QCL relationship with the TRS and/or the CSI-RS.

5. The method according to claim 3, wherein sending an RRC connection release message comprises:

sending the RRC connection release message carrying the QCL parameter in response to the UE being released to a second SSB frequency point, wherein the second SSB frequency point is different from a first SSB frequency point of a serving cell, and the QCL parameter is at least used for indicating an SSB of the second SSB frequency point having a QCL relationship with the TRS and/or the CSI-RS.

6. A non-transitory computer-readable storage medium, with an executable program stored thereon, wherein, when the executable program is executed by a processor, steps of the method for information transmission according to claim 1 are implemented.

7. A method for parameter determination, performed by a user equipment (UE), comprising:

determining, based on received physical layer parameter information of a tracking reference signal (TRS) and/or a channel state information reference signal (CSI-RS) and a frequency point to which the UE is released when transitioning from a connected state to a non-connected state, a first physical layer parameter used by the UE when in the non-connected state to receive the TRS and/or the CSI-RS to realize that the TRS and/or the CSI-RS are received in the non-connected state.

8. The method according to claim 7, wherein the first physical layer parameter comprises:

a quasi-colocation (QCL) parameter, wherein the QCL parameter is used for indicating a synchronization signals block (SSB) having a QCL relationship with the TRS and/or the CSI-RS, and/or a QCL type; and/or an SCS parameter indicating a sub-carrier space (SCS).

9. The method according to claim 8, wherein the received physical layer parameter information of the TRS and/or the CSI-RS comprises:

physical layer parameter information carried in a received system message, and/or physical layer parameter information carried in a received radio resource control (RRC) connection release message.

10. The method according to claim 9, wherein determining, based on received physical layer parameter information of a TRS and/or a CSI-RS and a frequency point to which the UE is released when transitioning from a connected state to a non-connected state, a first physical layer parameter used by the UE when in the non-connected state to receive the TRS and/or the CSI-RS, comprises:

determining the QCL parameter based on the physical layer parameter information carried in the system message and/or the physical layer parameter information carried in the RRC connection release message in response to the UE being released to a serving cell, wherein the QCL parameter is at least used for indicating an SSB of the serving cell having a QCL relationship with the TRS and/or the CSI-RS.

11. The method according to claim 10, wherein determining the QCL parameter based on the physical layer parameter information carried in the system message and the physical layer parameter information carried in the RRC connection release message comprises:

selecting one of the physical layer parameter information carried in the system message and the physical layer parameter information carried in the RRC connection release message based on a priority of the physical layer parameter information carried in the system message and a priority of the physical layer parameter information carried in the RRC connection release message, and determining the QCL parameter.

12. The method according to claim 9, wherein determining, based on received physical layer parameter information of a TRS and/or a CSI-RS and a frequency point to which the UE is released when transitioning from a connected state to a non-connected state, a first physical layer parameter used by the UE when in the non-connected state to receive the TRS and/or the CSI-RS, comprises:

determining the QCL parameter based on the physical layer parameter information carried in the RRC connection release message in response to the UE being released to a second SSB frequency point, wherein the second SSB frequency point is different from a first SSB frequency point of a serving cell, and the QCL parameter is at least used for indicating an SSB of the second SSB frequency point having a QCL relationship with the TRS and/or the CSI-RS.

13. The method according to claim 8, further comprising at least one of:

determining the first physical layer parameter based on a second physical layer parameter used by the UE when in the connected state to receive the TRS and/or the CSI-RS in response to the UE being released to a serving cell; or determining, in response to the UE being released to a second SSB frequency point, the first physical layer parameter based on an SSB detected by the UE at the second SSB frequency point, wherein the second SSB frequency point is different from a first SSB frequency point of a serving cell.

14. The method according to claim 7, wherein determining, based on received physical layer parameter information of a TRS and/or a CSI-RS and a frequency point to which the UE is released when transitioning from a connected state to a non-connected state, a first physical layer parameter used by the UE when in the non-connected state to receive the TRS and/or the CSI-RS, comprises:

determining the first physical layer parameter based on a second physical layer parameter used by the UE when in the connected state to receive the TRS and/or the CSI-RS in response to the UE being released to a serving cell and not receiving the physical layer parameter information.

15. The method according to claim 7, wherein determining, based on received physical layer parameter information of a TRS and/or a CSI-RS and a frequency point to which the UE is released when transitioning from a connected state to a non-connected state, a first physical layer parameter used by the UE when in the non-connected state to receive the TRS and/or the CSI-RS, comprises:

determining, in response to the UE being released to a second SSB frequency point and not receiving the physical layer parameter information, a QCL correspondence relationship based on an SSB detected by the UE at the second SSB frequency point, wherein the second SSB frequency point is different from a first SSB frequency point of a serving cell.

16. A communication device, comprising a processor, a memory, and an executable program stored on the memory and capable of being run by the processor, wherein, when the processor runs the executable program, steps of the method for parameter determination according to claim 7 are performed.

17. A non-transitory computer-readable storage medium, with an executable program stored thereon, wherein, when the executable program is executed by a processor, steps of the method for information transmission according to claim 7 are implemented.

18. A communication device, comprising a processor, a memory, and an executable program stored on the memory and capable of being run by the processor, wherein the processor runs the executable program to perform:

sending physical layer parameter information of a tracking reference signal (TRS) and/or a channel state information reference signal (CSI-RS), wherein the physical layer parameter information is used for indicating a first physical layer parameter used by a user equipment (UE) in a non-connected state when receiving the TRS and/or the CSI-RS to realize that the TRS and/or the CSI-RS are received in the non-connected state.

19. The communication device according to claim 18, wherein the first physical layer parameter comprises:

a quasi-colocation (QCL) parameter, wherein the QCL parameter is used for indicating a QCL relationship between the TRS and/or the CSI-RS and a synchronization signals block (SSB), and/or a QCL type; and/or, an SCS parameter indicating a sub-carrier space (SCS).

20. The communication device according to claim 19, wherein sending physical layer parameter information of a TRS and/or a CSI-RS comprises at least one of:

sending a system message, wherein the system message carries the physical layer parameter information; or sending a radio resource control (RRC) connection release message, wherein the RRC connection release message carries the physical layer parameter information.

\* \* \* \* \*